United States Patent
Crema et al.

(10) Patent No.: US 6,729,179 B2
(45) Date of Patent: May 4, 2004

(54) METHOD AND APPARATUS FOR DESTRUCTIVE AND/OR NONDESTRUCTIVE TESTING OF ONE OR MORE TIRES

(75) Inventors: Fabrizio Crema, Torre Boldone (IT); Carlo Di Bernardo, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/009,585

(22) PCT Filed: Apr. 4, 2001

(86) PCT No.: PCT/EP01/03823

§ 371 (c)(1),
(2), (4) Date: Dec. 11, 2001

(87) PCT Pub. No.: WO01/81886

PCT Pub. Date: Nov. 1, 2001

(65) Prior Publication Data

US 2003/0037608 A1 Feb. 27, 2003

Related U.S. Application Data

(60) Provisional application No. 60/231,695, filed on Sep. 11, 2000.

(30) Foreign Application Priority Data

Apr. 12, 2000 (IT) ..................... MI2000A0809

(51) Int. Cl.$^7$ ............................................. G01M 17/02
(52) U.S. Cl. ............................................... 73/146
(58) Field of Search ................... 73/146; 152/154.1, 152/454, 548, 556, 527; 425/58.1; 156/64

(56) References Cited

U.S. PATENT DOCUMENTS

| 4,651,787 A | | 3/1987 | Appl | |
|---|---|---|---|---|
| 5,328,084 A | | 7/1994 | Billieres | |
| 5,458,176 A | * | 10/1995 | Rhyne | ................ 152/556 |
| 5,616,859 A | * | 4/1997 | Rhyne | ................ 73/146 |

* cited by examiner

Primary Examiner—William Oen
(74) Attorney, Agent, or Firm—Finnegan, Henderson, Farabow, Garrett & Dunner, L.L.P.

(57) ABSTRACT

A method for testing tires includes setting a tire, with a predefined inflation pressure and load condition, in rotation on a surface with a predefined speed, and applying a pressure against a sidewall of the tire in proximity to a contact area of the tire with the surface. The pressure is applied using a shaped body for deforming the tire sidewall according to a profile including at least two portions with opposite curvatures. A related apparatus includes a surface, an arm for supporting a tire, a device for setting the tire in rotation on the surface, and a shaped body movable transversely with respect to the tire between a non-operative position and an operative position. In the operative position, the shaped body pushes against a sidewall of the tire to deform the tire sidewall a predefined depth with respect to an undeformed profile of the tire sidewall.

28 Claims, 7 Drawing Sheets

METHOD AND APPARATUS FOR DESTRUCTIVE AND/OR NONDESTRUCTIVE TESTING OF ONE OR MORE TIRES

CROSS-REFERENCE TO RELATED APPLICATIONS

This application is a national stage entry under 35 U.S.C. §371 from International Application No. PCT/EPO01/03823, filed Apr. 4, 2001, in the European Patent Office; additionally, Applicants claim the right of priority under 35 U.S.C. §119(a)–(d) based on patent application No. Mi2000A000809, filed Apr. 12, 2000, in the Italian Patent Office; further, Applicants claim the benefit under 35 U.S.C. §119(e) based on prior-filed, copending provisional application No. 60/231,695, filed Sep. 11, 2000, in the U.S. Patent and Trademark Office; the contents of all of which are relied upon and incorporated herein by reference.

The invention relates to a method for testing tires and to an apparatus for implementation thereof, intended in particular but not exclusively for tires of heavy road haulage vehicles (lorries and the like).

DESCRIPTION OF RELATED ART

A phenomenon typically affecting these kinds of tires (alternatively spelled "tires") consists of the breaks which reveals itself as a clean cut on the side of the tire (alternatively spelled "tire"), extending circumferentially thereto and along which a cutting-off of the radial cords forming the carcass of the tire occurs. This phenomenon is known to persons skilled in the art by the name of "zipper break."

The reinforcing cords of tire carcasses for heavy road haulage generally consist of metallic wires and are much stronger than textile cords commonly used in the carcasses of car tire. As a results it is difficult to understand how this type of break occurs, especially when taking into account that failure may occur after only a short distance traveled by the tire.

In other words, said "zipper break" cannot be attributed to the normal wear to which a tire is subject following prolonged use over time or in particularly severe conditions (heavy load, rough road surface, etc.), and does not fall within the other known forms of tire breaks.

Consequently, it is difficult, if not impossible, to understand and reproduce with the usual methods (computer analysis, experiments, etc.) the conditions that—in real driving conditions—lead to the "zipper break" of tires. Additionally, this problem renders it difficult, if not impossible, to provide tire structures for lorries and the like specifically designed to prevent this particular type of break.

SUMMARY OF THE INVENTION

The present invention aims at remedying this situation.

The invention arises from Applicant's perception that the "zipper break" is caused by abnormal and occasional working conditions of the sidewall of the tire, capable of causing a particular fatigue stress in the carcass structure.

An example of these stresses is the so-called "kissing", i.e. the interference which occurs between two tires mounted side by side on the same axle (such as the twinned tires in the lorries) in the event of an excessive load acting on them, or when one of the tires is operating with an inflation pressure lower than that of the other tire or both the tires have a pressure which is lower than the nominal operating pressure.

Therefore, on the basis of said perception, the present invention provides a method for testing tires and an apparatus for carrying out said method, suitable for reproducing the conditions which, during use, give rise to the phenomenon of "zipper break".

The characterising features of said method and of the abovementioned apparatus are set out in the following claims.

BRIEF DESCRIPTION OF THE DRAWINGS

Said features, together with the effects arising therefrom, will emerge more clearly from the description herebelow of a preferred and non-exclusive embodiment of the invention, illustrated in the accompanying drawings, wherein.

DETAILED DESCRIPTION OF THE PREFERRED EMBODIMENTS

Figure 3:
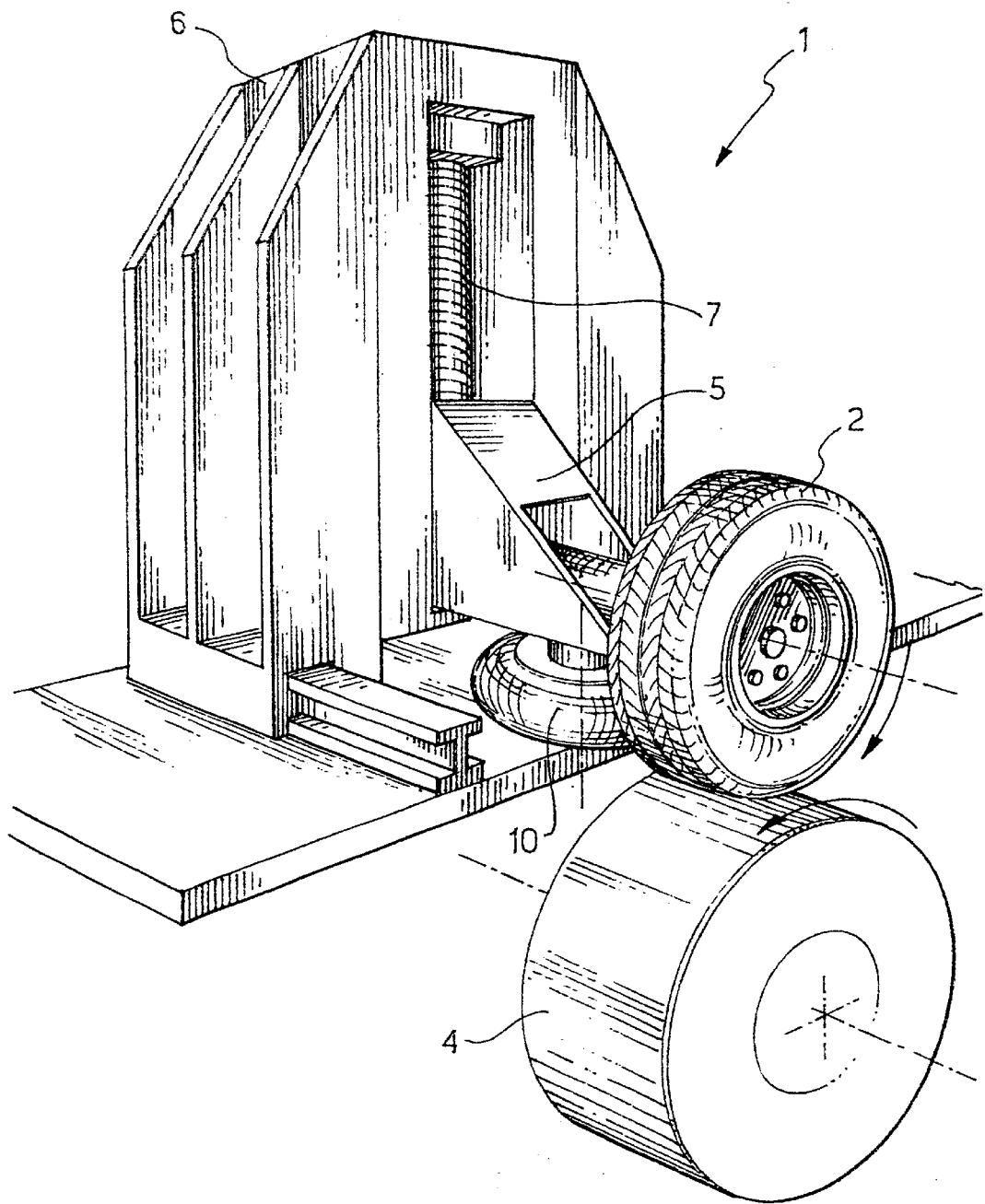
FIG. 3 shows a perspective view of an apparatus for carrying out the method according to the invention.
Figure 4:
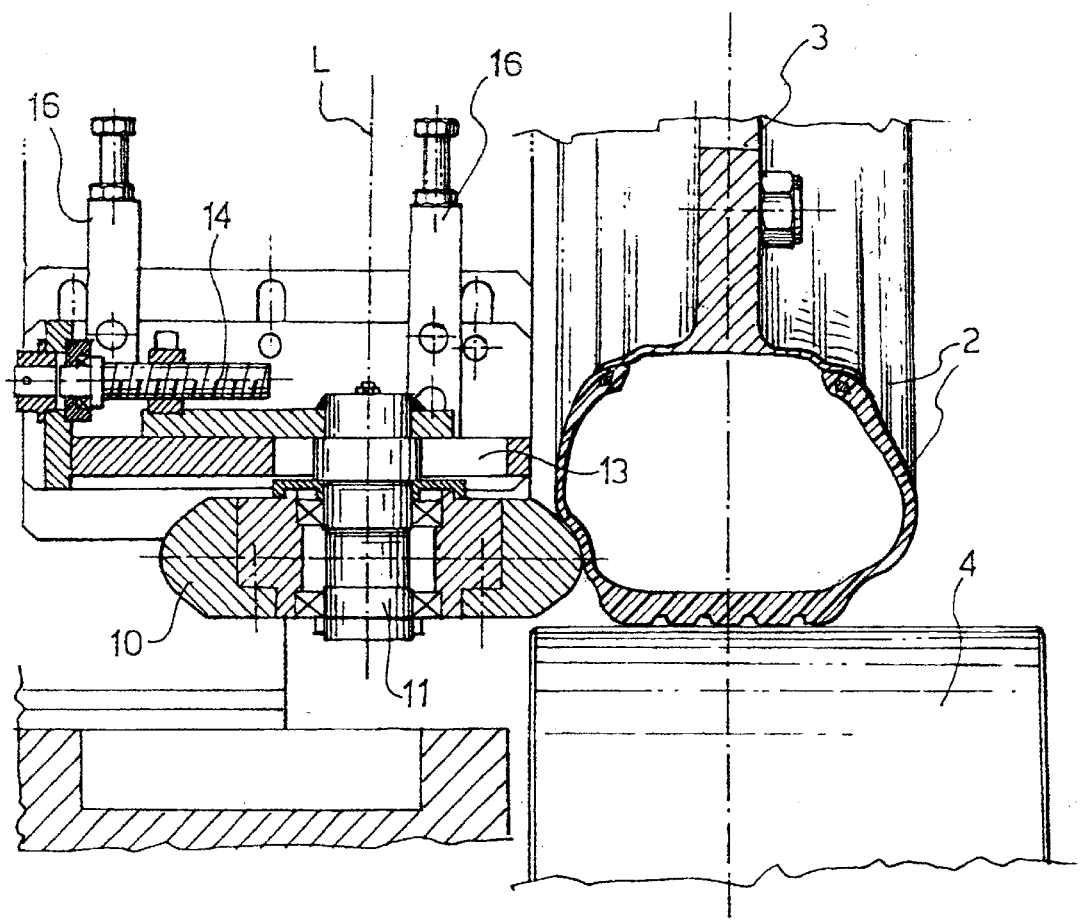
FIG. 4 shows a cross-sectional view of the apparatus of FIG. 3.

With reference to FIGS. 3 to 6, there will be first described an apparatus for carrying out the abovementioned method, indicated in its entirety by reference sign 1 in FIG. 3.

Said apparatus is derived from those apparata normally used for rolling tests, in which a tire 2, mounted on a rim 3, is set in rotation on a rotating drum 4 (also called "roadwheel") thereby simulating the operation of a tire on the road The tire 2, mounted idle on its axle, is set in rotation by the drum 4, operated by a motor (electrical or of another type), which is not shown in the drawings. The rolling conditions of the tire 2 on the drum 4 may be varied during the test by modifying the speed of rotation, the load applied to the tire, and the slip and camber angles given to the tire axis.

For this purpose, the rim 3 is mounted on an arm 5 which projects from the frame 6 of the apparatus 1, said arm being movable upwards and downwards along said frame by means of an operating screw 7.

By varying the height position of said arm 5, a smaller or greater contact force between the tire 2 and the drum 4 is obtained, thus simulating various loading conditions acting on the wheel of a vehicle.

The Figures do not show the devices for varying the camber and slip angles since they are known and not relevant for the purposes of understanding the invention.

A shaped disc 10 is arranged in a position underneath the arm 5 (as will be explained more clearly below), being mounted idle on a vertical support pin 11 such that said disc 10 is free to rotate with respect to the vertical axis L of such pin 11, which is perpendicular to the axis of rotation of the tire 2.

The pin 11 is, in turn, movable to translate along a horizontal guide 13 by means of a screw/lead nut thread coupling 14 or similar device. This movement allows the disc 10 to move towards or away from the tire 2 in accordance with preselected methods of performing the test.

Finally, the guide 13 is also vertically displaceable by means of a set of four screwed columns 16, so as to vary the position of the disc 10 along the sidewall of the tire 2.

Figure 5:
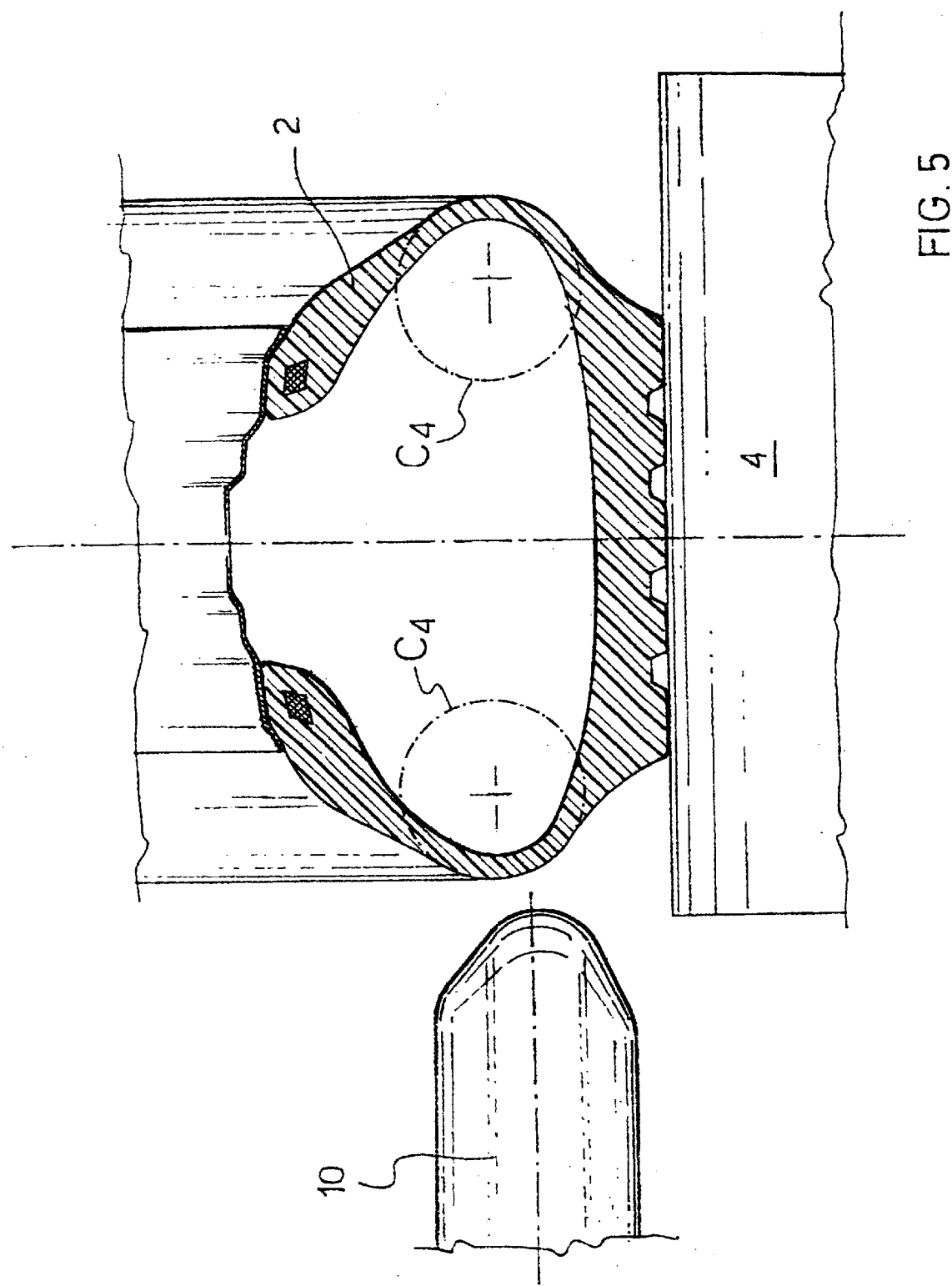
FIGS. 5 and 6 show in detail two steps of the method according to the invention.

According to the method of the invention, the disc 10 is gradually moved towards the tire 2 while the latter is rolling on the drum 4, starting from an initial position wherein the disc 10 is at a distance from the tire 2 (see FIG. 5).

When the disc 10 comes into contact with the sidewall of the rotating tire, it is the frictional force which sets the disc 10 in rotation.

Figure 6:
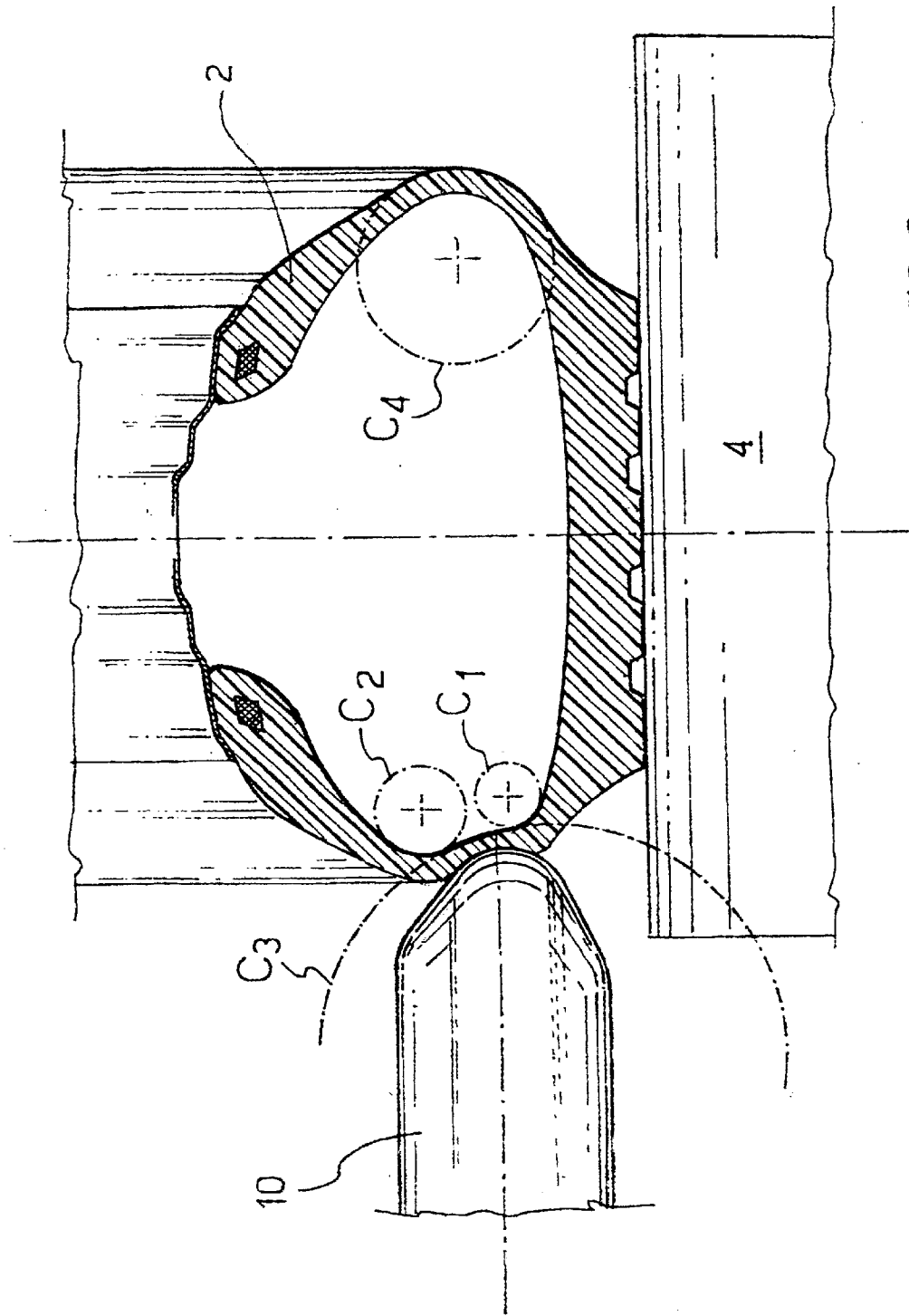

At this point of the test, the disc 10 is pushed further against the sidewall of the tire, which is thus deformed by it as shown in FIG. 6.

The penetration depth of the disc 10 into the sidewall of the tire 2, following initial contact between them, is a parameter—measured in mm or in other units of length—which provides an indication of the penetration degree of the sidewall of a first tire into the sidewall of a second tire alongside the first one, namely an indication of the deformation following the abovementioned "kissing" between two adjacent tires.

Figure 1:
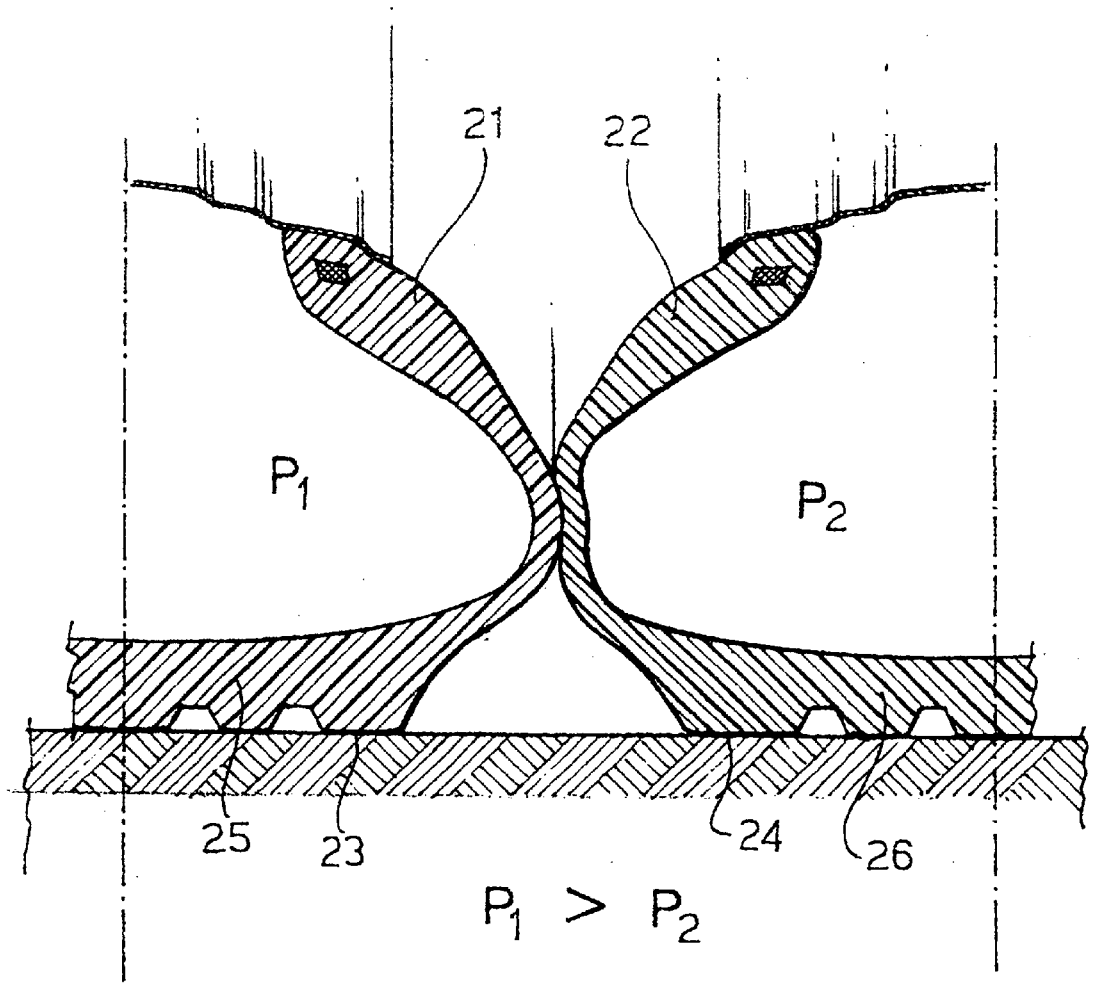
FIG. 1 shows a partial radial cross-section of the interference zone of a pair of twinned tires in "kissing" condition.
Figure 2:
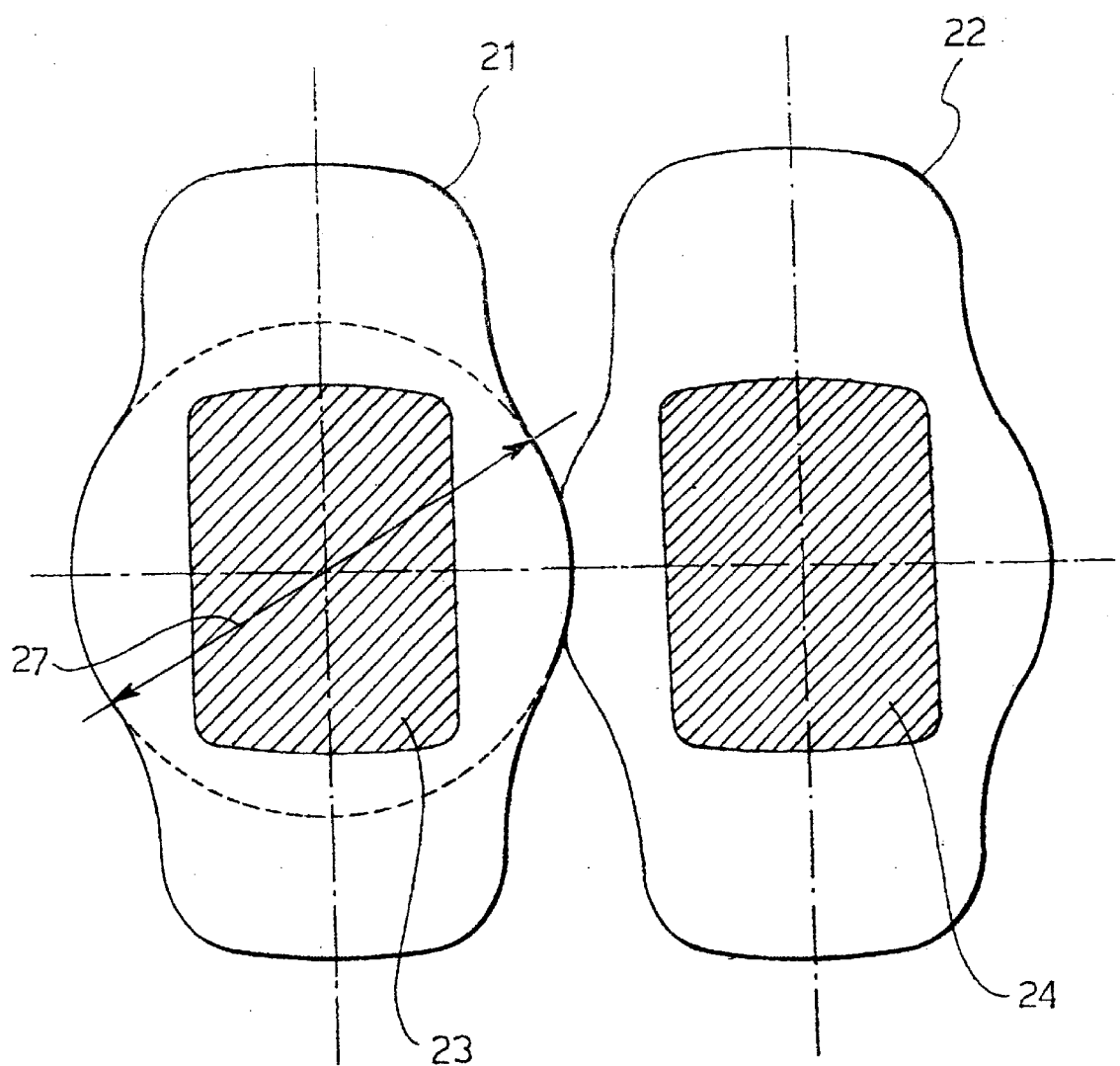
FIG. 2 shows a top plan view of the interference zone of FIG. 1.

In order to better understand this concept, reference should be made to FIG. 2, which is a plan view showing the deformations of two twinned tires 21, 22, also shown radially sectioned in FIG. 1. In particular, the pressure $P_1$ in the first tire 21 is greater than the pressure $P_2$ in the second tire 22.

This is the typical situation that occurs when one of the two twinned tires has a pressure that is lower than that of the other tire. Consequently, the distribution of the load over the tires is not uniform. As a result, excessive compression (in the cross-section) of the tires arises. In normal operating conditions, on the other hand, the two tires are not in contact with each other. If the two twinned tires have different pressures, the sidewall of the tire with a higher pressure compresses the sidewall of the tire with a lower pressure, thereby giving rise to the phenomenon of "kissing."

As shown in FIG. 2, this situation affects the part of the tires 21, 22 located in connection with the footprint areas 23, 24 of the respective tread bands 25, 26. These areas are indicated with the hatch in FIG. 2 and represent the tire zone where contact with the ground occurs.

In accordance with a preferred embodiment of the invention, the deformed configuration of the tire 21, whose sidewall urges against the sidewall of the tire 22, may be advantageously reproduced by a circular disc which has a diameter 27 similar to that of the curvature of the sidewall of the higher-pressure tire.

The shape of the disc is indicated by the broken circular line in FIG. 2, which corresponds to the shaped disc 10 used in the apparatus 1 described above. The height and the profile of the disc 10 are therefore shaped so as to reproduce the penetration of the sidewall of a first tire into the sidewall of a second tire arranged alongside the first tire.

Therefore, by varying the position of the disc 10 with respect to the sidewall of the tire to be tested, with the method according to the invention it is possible to reproduce the various "kissing" situations which occur in real conditions when two twinned tires are used.

More specifically, with reference to FIG. 6, it can be seen that when the disc 10 urges against the sidewall of tire 2, the latter is deformed, assuming a profile with curvatures in opposite senses, l.e., concave in certain points and convex in others. This situation is represented by the circumferences $C_1$, $C_2$, and $C_3$ (the latter shown only partially) in FIG. 6, which are arranged along the sidewall of the tire 2 and defined by different radii of curvature that are assumed by the sidewall during "kissing."

If the disc 10 is pushed further (by means of the lead nut thread 14) against the sidewall of the tire, the radii of the three circumferences $C_1$, $C_2$ and $C_3$ change with respect to those shown in FIG. 6; the same thing happens if the disc 10 is moved vertically (by means of the screw columns 16) with respect to the tire 2, without changing the distance between the disc 10 rotation axis and the median (equatorial) plane of tire 2.

By comparing FIGS. 1 and 6, it is possible to appreciate the correspondence between the tire sidewall deformation obtained with the method according to the invention and that caused by the interference between two tires in "kissing" condition.

At this point, however, it has to be pointed out that the abovementioned deformation occurs only in the sidewall zone affected by "kissing." In the remaining part, the sidewall has a different, generally convex, profile that may be approximated with a circumference such as that indicated by $C_4$ in FIG. 5, relating to the undeformed condition of the tire.

Consequently, for each revolution of the tire, the sidewall subjected to the "kissing" phenomenon undergoes a cyclical deformation when it passes through the interference zone. This results in a change of its configuration from a generally convex one, with a substantially-uniform radius of curvature (such as that of the circumference $C_4$), to a configuration where there is a concave zone (that of the circumference $C_3$) and convex zones having small radii of curvature (defined by $C_1$ and $C_2$).

This means that the sidewall of the tire and the components which form it, i.e. the lining rubber and the carcass wires, are subjected to an alternate stress whose magnitude depends on the degree of "kissing" deformation (caused by an adjacent tire or by the testing disc 10) and having a frequency equal to the number of revolutions of the tire in a given unity of time.

The Applicants have found that said alternate stress produces a fatigue stressing in the sidewall of the tire, and in particular in the metallic carcass cords, thereby leading to the "zipper break" of the sidewall, as described above.

Further, it should be observed that the deformation takes place on the tire sidewall along at least two different planes: a substantially-radial plane (containing the tire rotation axis—FIG. 6) and another one, substantially perpendicular to the equatorial plane of the tire FIG. 2).

According to Applicants' opinion, without any limitation arising therefrom, the break of the cords should be ascribed to a combined fatigue action, due to the combined compression (buckling) and flexion stresses that are particularly high when the tire is running with an inflation pressure lower than the nominal one, or in particular, during rolling conditions (for instance, along a curvilinear path).

The identity between the types of breaks occurred in real life and those caused during laboratory tests, was verified by performing a comparative analysis of the fracture sections of the carcass cords belonging to tires mounted on lorries and removed from the vehicle after "zipper break", and the fracture sections of cords of tires tested on the apparatus according to the invention.

This analysis has shown that, in both cases (testing method and real conditions), yielding of the cord wires in the tire broken zone is due to fatigue. As persons skilled in the art know well, in this case, the break of the wires may occur along a clean plane (with angles, for example, between 90° and 45°) or may have a "flute tip" form.

These results have been confirmed (and have demonstrated their reproducibility) in a series of tests which were carried out using the apparatus 1 described above, said tests being explained herein below with the aid of some tables.

The tests consisted of subjecting tires of different rubber compound compositions and/or carcass structures to an operating cycle on the apparatus 1, varying, with pre-established steps, the penetration depth of disc 10 into the sidewall of the tire, the pressure of the tire, and the load acting on the tire.

In particular, the penetration depth of disc 10 was considered its position with respect to a reference condition in which said disc is tangential to the tire sidewall. This parameter was measured in millimeters.

In the tables below, the penetration depth of the disc, referred to as "kissing", has been assumed as the parameter representing the simulated degree of interference between two tires in real conditions.

The first experiment was carried out on 315/80 R22.5 Applicants' tires, generically defined as "model A".

In particular, a first tire (I), with gradually-increasing load and pressure levels following a step-by-step sequence including, for the tire size above, a load variation from 3,000 kg to 9,000 kg (nominal load of 4,000 kg) and an inflation pressure variation from 5 bar to 9 bar (nominal pressure of 8 bar), was tested. The results obtained are shown in Table 1, from which it can be noted that there was no "zipper break" of the tire, but only a deterioration thereof as a result of sidewall-rubber removal from the carcass along the sidewall against which the disc had acted after 400 hours. Therefore, the "zipper break" does not depend on the load variation acting on the tire.

Thereafter a second tire (II) was tested, starting directly with the more severe conditions reached by the first tire (I). Also in this case there was no "zipper break", but only deterioration with removal of the rubber after 148 hours.

In other words, the method according to the invention has demonstrated with the results of said first test that "zipper break" does not depend on the heaviness of the operating conditions to which tires are subjected.

TABLE 1

315/80 R22.5 tyre - "Model A"

| Tyre No. | Load (kg) | Pressure (bar) | Kissing (mm) | Speed (km/h) | Duration (hours) | Type of break |
|---|---|---|---|---|---|---|
| I | 3000 | 5 | 15 | 40 | 240 | |
| I | 6000 | 9 | 15 | 30 | 100 | |
| I | 9000 | 9 | 20 | 30 | 60 | Separation of rubber |
| II | 9000 | 9 | 20 | 30 | 148 | Separation of rubber |

Thereafter less severe conditions for the tires were chosen as regards the load, but using inflation testing pressures substantially lower than the nominal one; the results for the same type of tire ("model A") used in the first experiment are shown in Table 2.

TABLE 2

315/80 R22.5 tyre - "Model A"

| Tyre No. | Load (kg) | Pressure (bar) | Kissing (mm) | Speed (km/h) | Duration (hours) | Type of break |
|---|---|---|---|---|---|---|
| I | 2000 | 2.5 | 15 | 60 | 24 | "Zipper break" |
| II | 2000 | 2.5 | 15 | 60 | 7 | "Zipper break" |
| III | 2000 | 2.5 | 15 | 60 | 10 | "Zipper break" |

As can be seen, in these operating conditions after a fairly limited number of hours of operation (24 h, 7 h and 10 h, respectively for tires I, II, III), "zipper break" of the tires occurred; it should be noted that this happened with a low inflation pressure in accordance with what was explained before about the fact that, in real conditions, this particular break takes place when one of the two twinned tires has an inflation pressure lower than the other.

The behaviour of the tires with regard to this phenomenon (i.e., a greater or smaller duration) generally depends on their structure and therefore on the carcass type as well as on the rubber compound used for the manufacture of the various parts of the tires and on the tread pattern.

This may be easily appreciated from Table 3, which refers to a test cycle carried out by using the same parameters as in Table 2 on Applicants' tires of the same sizes but with a different tread pattern ("Model B").

As can be seen, the number of hours following which "zipper break" occurred is substantially greater in this second case.

TABLE 3

315/80 R22.5 tyre - "Model B"

| Tyre No. | Load (kg) | Pressure (bar) | Kissing (mm) | Speed (km/h) | Duration (hours) | Type of break |
|---|---|---|---|---|---|---|
| I | 2000 | 2.5 | 15 | 60 | 116 | "Zipper break" |
| II | 2000 | 2.5 | 15 | 60 | 85 | "Zipper break" |
| III | 2000 | 2.5 | 15 | 60 | 94 | "Zipper break" |

Finally, as mentioned further above, at the basis of the present invention is Applicants' perception that "zipper break" depends on a fatigue phenomenon, following the cyclical deformation of the tire sidewall when it is subjected to "kissing".

For this purpose, special tests were thus carried out during which all other conditions (i.e., pressure, speed, load) remained unchanged. During these special tests, the penetration depth of the test disc 10 into the tire sidewall, i.e., the degree of deformation thereof, was varied.

In particular, during the experimentation, it was decided to increase gradually stepwise the "kissing" value applied to the test tire, after a predefined test period (24 hours).

The results relating to tests carried out on three 315/80 R22.5 tires, "Model C" are shown in Table 4. Said tests clearly show the existence of a "kissing" level below which zipper break does not occur.

Indeed, as shown, in the case of two tires (I and II) subjected to "kissing" values of 30 mm and 32.5 mm, respectively, after 96 and 168 (i.e., 4 days and 7 days)

continuous hours of testing, no fault occurred. In contrast, after just two hours of testing (again for the same tire I and II) at a higher "kissing" value (40 mm), the "zipper break" occurred.

Likewise, another tire (III) subjected as from the first step to a "kissing" value of 40 mm, revealed the "zipper break" after only three hours.

TABLE 4

315/80 R22.5 tyre - "Model C"

| Tyre No. | Kissing (mm) | Duration (hours) | Result |
|----------|--------------|------------------|---------------|
| I | 30 | 96 | no fault |
| I | 40 | 2 | "Zipper break" |
| II | 32.5 | 168 | no fault |
| II | 40 | 2 | "Zipper break" |
| III | 40 | 3 | "Zipper break" |

Figure 7:
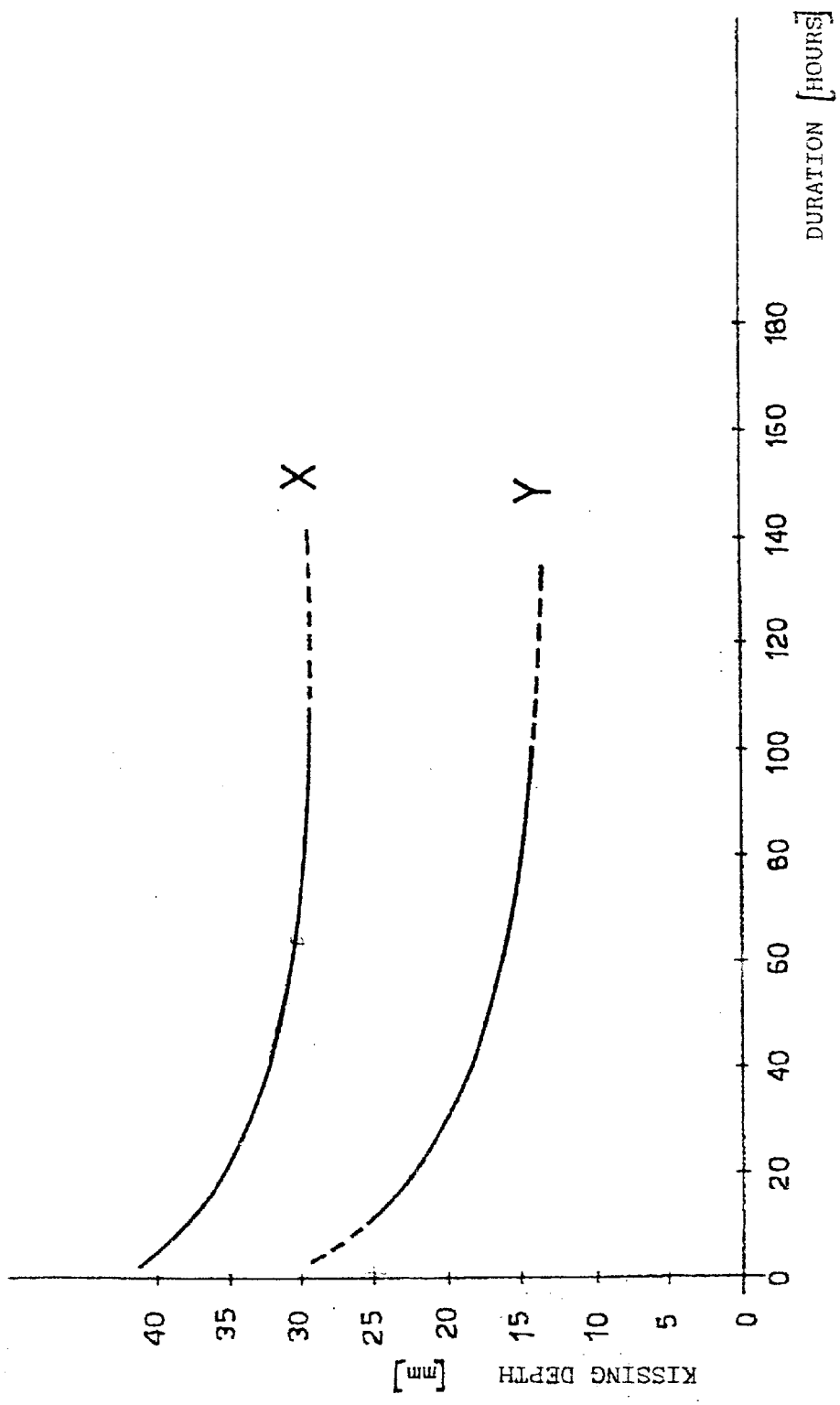
FIG. 7 is a diagram showing the behaviour of two different tires during the testing method according to the invention.

On the basis of the tests carried out by the Applicants, for each tested tire it was possible to obtain a curve whose typical trend is shown in the graph of FIG. 7.

This graph carries along the abscissa axis the duration of the test carried out on a tire and along the ordinate axis the penetration depth ("kissing") of the disc 10 into the tire sidewall.

The curves X and Y of FIG. 7 relate, respectively, to a given manufacturing type of a tire, under predetermined load and pressure conditions. More specifically, curve X relates to a Model A tire with a nominal load of 9,000 kg and an operating pressure of 3 bar, while curve Y relates to a Model B tire.

As shown, the typical trend of said curves is generally decreasing, with a profile roughly parabolic characterised by the presence of a horizontal asymptote (broken line): this means that in the case of "kissing" values lower than said asymptote, no "zipper break" occurs.

Furthermore, the graph of FIG. 7 shows the displacement of the typical curves related to the different structures of the tires.

More in detail, FIG. 7 the duration/penetration depth curves of two different Applicants' tires X and Y are compared.

Furthermore, a person skilled in the art may appreciate how the trend of said curves is similar to that of the well-known Wholer curves, relating to the fatigue of materials subjected to alternate stresses.

For this purpose it is sufficient to consider that, for example, in the case of tires having the sizes referred to above, a test lasting for 100 hours at a speed of 60 km/h corresponds to about $1.8 \times 10^6$ cycles of alternate stress applied to the carcass cords.

Moreover, the degree of "kissing," on which the degree of deformation of the carcass cords depends, produces in the cords a corresponding state of tension. Consequently, along the ordinate axis of the graph in FIG. 7, it is possible to replace the "kissing" parameter (in mm) with the tensile-stress parameter (in Pa or kg/mm$^2$), thereby obtaining, also from this point of view, a perfect correspondence with the Wholer curves.

In other words, the "kissing" deformation test carried out by using the method according to the invention is equivalent to a test in which the tire sidewall and the carcass cords are cyclically stressed by changing the curvature thereof in accordance with that explained above in connection with FIGS. 5 and 6.

Therefore, it follows that a state of fatigue is induced in these components (sidewall and associated cords) which causes their sudden yielding (collapse) within brief periods and under not particularly severe conditions (tire load and inflation pressure).

In light of the foregoing, it has been shown that the method according to the invention simulates conditions corresponding to those that exist during real conditions, where the "zipper break" can occur on tires that are almost new and, more generally, at any time during the life of the tire. For this reason, it is sufficient that the tire operates under "critical" conditions (i.e., above the asymptote of the curves shown in FIG. 7), even for a limited number of hours.

Applicants have also found that a "memory effect" exists in the tested tires.

Indeed, the experiments carried out have shown that it is not necessary for the tire to be kept continuously under the abovementioned critical conditions to achieve the "zipper break" thereof; said break occurs also if the tire is kept under said conditions for several periods of time alternate, at intervals, with normal operating conditions (i.e., with no "kissing"), provided that the overall sum of the partial periods is such as to reach the fatigue limit defined in the diagram according to FIG. 7.

In this connection, finally, it is important to underline an important advantage achieved by the apparatus according to the invention.

Indeed, as mentioned above, the invention arises from Applicants' perception that the "zipper break" of tires mounted on lorries is caused by the interference which occurs between two twinned tires, as shown in FIG. 1.

Consequently, on the basis of this perception it would also be possible to carry out the method of the invention using an apparatus in which there are two tires arranged side by side, one of said tires causing the deformation of the other one.

Such an apparatus would, however, be much more complex than that shown in FIG. 3 and therefore also the tests would be more difficult to be performed since, in order to produce an interference of the desired degree, it would be necessary to adjust several parameters instead of the abovementioned penetration ("kissing") of the test disc 10.

Of course, other variations of the invention with respect to that described hitherto will also be possible.

In one embodiment, not shown, a load cell is positioned on the axis of the disc 10 so as to measure the lateral force exerted by said disc on the sidewall of the tire to be tested.

Furthermore, in the example described above, the disc 10 is mounted in an idle manner and is driven rotatably by means of the contact with the tire to be tested. In accordance with a further embodiment of the invention, the disc, being driven by a motor, is set in rotation at a required speed for carrying out tests, where the effect of relative frictional contact thereof with the tire is assessed.

Moreover, the rounded profile of the external edge of the disc can be different from that shown in the drawings.

For instance, it can have discontinuities, ribs and/or projections so as to simulate the presence of a stone or the like squashed between two adjacent tires, as sometimes occurs under real conditions.

The disc 10 considered above is movable horizontally, in order to vary the penetration depth into the tire sidewall, and vertically, in order to deform the sidewall at different heights when required. However, it is possible to provide apparata where the inclination of the rotation axis of the disc is also adjustable with respect to the meridian plane of the tire, so as to obtain further experimental effects.

Last, the rolling surface of the tire to be tested, which in the above apparatus consists of the usual road-wheel, could also be made by using another equivalent system; for example, use could be made of a conveyor belt (suitably supported in the footprint area of the tire) which would allow tests to be carried out on tires rotating on a flat surface.

Finally it is necessary to take into consideration the fact that, although the invention is of particular interest for tires intended for applications on industrial vehicles, where "zipper breaks" caused by twinned tires occur, it may nevertheless be applicable more generally also to any tire in order to study their behaviour in response to stresses cyclically acting thereon.

We claim:

1. A method for testing a tire, comprising:
   setting a tire, with a predefined inflation pressure and load condition, in rotation on a surface with a predefined speed of the tire; and
   applying a pressure, while the tire rotates, against a sidewall of the tire in proximity to a contact area of the tire with the surface using a shaped body for deforming the tire sidewall according to a profile;
   wherein the profile comprises at least two portions with opposite curvatures, concave and convex.

2. The method of claim 1, wherein the shaped body is moved transversely with respect to the tire between a non-operative position and an operative position,
   wherein, in the non-operative position, the shaped body is not in contact with the tire sidewall, and
   wherein, in the operative position, the shaped body pushes against the tire sidewall to deform the tire sidewall a predefined depth with respect to an undeformed profile of the tire sidewall.

3. The method of claim 1, wherein the shaped body is movable along the tire sidewall, in a radial direction with respect to the tire, to deform the tire sidewall at different heights.

4. The method of claim 1, wherein the shaped body is set in rotation at a predefined speed of the shaped body.

5. An apparatus for testing a tire, comprising:
   a surface;
   an arm for supporting a tire;
   a device for setting the tire in rotation on the surface; and
   a shaped body movable transversely with respect to the tire between a non-operative position and an operative position;
   wherein, in the operative position, the shaped body pushes against a sidewall of the tire to deform the tire sidewall a predefined depth with respect to an undeformed profile of the tire sidewall, and
   wherein the testing is conducted in the operative position while the tire rotates.

6. The apparatus of claim 3, wherein the shaped body is a rotatable disc.

7. The apparatus of claim 5, wherein the shaped body is movable along the tire sidewall, in a radial direction with respect to the tire, to deform the tire sidewall at different heights.

8. The apparatus of claim 5, wherein the shaped body is set in rotation at a predefined speed of the shaped body.

9. The apparatus of claim 6, wherein a rotation axis of the disc is inclined with respect to a meridian plane of the tire.

10. The apparatus of claim 5, wherein the surface is a rotating drum.

11. The apparatus of claim 5, wherein the arm is movable to vary a load applied to the tire.

12. The apparatus of claim 5, wherein the shaped body deforms the tire sidewall in proximity to a contact area of the tire with the surface.

13. An apparatus for testing a tire, comprising:
    a surface;
    an arm for supporting a tire;
    a device for setting the tire in rotation on the surface; and
    a shaped body movable transversely with respect to the tire between a non-operative position and an operative position;
    wherein, in the operative position, the shaped body pushes against a sidewall of the tire to deform the tire sidewall a predefined depth with respect to an undeformed profile of the tire sidewall, and
    wherein the shaped body is substantially perpendicular to an equatorial plane of the tire.

14. The apparatus of claim 13, wherein the shaped body is a rotatable disc.

15. The apparatus of claim 13, wherein the shaped body is movable along the tire sidewall, in a radial direction with respect to the tire, to deform the tire sidewall at different heights.

16. The apparatus of claim 13, wherein the shaped body is set in rotation at a predefined speed of the shaped body.

17. The apparatus of claim 14, wherein a rotation axis of the disc is inclined with respect to a meridian plane of the tire.

18. The apparatus of claim 13, wherein the surface is a rotating drum.

19. The apparatus of claim 13, wherein the arm is movable to vary a load applied to the tire.

20. The apparatus of claim 13, wherein the shaped body deforms the tire sidewall in proximity to a contact area of the tire with the surface.

21. An apparatus for testing a tire, comprising:
    a surface;
    an arm for supporting a tire;
    a device for setting the tire in rotation on the surface; and
    a shaped body movable transversely with respect to the tire between a non-operative position and an operative position;
    wherein, in the operative position, the shaped body pushes against a sidewall of the tire to deform the tire sidewall a predefined depth with respect to an undeformed profile of the tire sidewall, and
    wherein, in the operative position, the shaped body is substantially perpendicular to an equatorial plane of the tire.

22. The apparatus of claim 21, wherein the shaped body is a rotatable disc.

23. The apparatus of claim 21, wherein the shaped body is movable along the tire sidewall, in a radial direction with respect to the tire, to deform the tire sidewall at different heights.

24. The apparatus of claim 21, wherein the shaped body is set in rotation at a predefined speed of the shaped body.

25. The apparatus of claim 22, wherein a rotation axis of the disc is inclined with respect to a meridian plane of the tire.

26. The apparatus of claim 21, wherein the surface is a rotating drum.

27. The apparatus of claim 21, wherein the arm is movable to vary a load applied to the tire.

28. The apparatus of claim 21, wherein the shaped body deforms the tire sidewall in proximity to a contact area of the tire with the surface.

* * * * *

UNITED STATES PATENT AND TRADEMARK OFFICE
CERTIFICATE OF CORRECTION

PATENT NO. : 6,729,179 B2
DATED : May 4, 2004
INVENTOR(S) : Fabrizio Crema et al.

It is certified that error appears in the above-identified patent and that said Letters Patent is hereby corrected as shown below:

Column 9,
Line 54, "claim 3," should read -- claim 5, --.

Signed and Sealed this

Twelfth Day of October, 2004

JON W. DUDAS
*Director of the United States Patent and Trademark Office*